United States Patent
Bamberger et al.

(10) Patent No.: US 12,470,171 B2
(45) Date of Patent: Nov. 11, 2025

(54) METHOD, COMPUTER-IMPLEMENTED TOOL AND POWER PLANT CONTROL DEVICE FOR DETECTING POWER PRODUCTION DEGRADATION OF SOLAR POWER PLANTS AND SOLAR POWER PLANT SYSTEM

(71) Applicant: Siemens Aktiengesellschaft, Munich (DE)

(72) Inventors: Joachim Bamberger, Stockdorf (DE); Amer Mesanovic, Munich (DE); Andrei Szabo, Ottobrunn (DE)

(73) Assignee: Siemens Aktiengesellschaft, Munich (DE)

( * ) Notice: Subject to any disclaimer, the term of this patent is extended or adjusted under 35 U.S.C. 154(b) by 639 days.

(21) Appl. No.: 17/207,892

(22) Filed: Mar. 22, 2021

(65) Prior Publication Data

US 2021/0305936 A1 Sep. 30, 2021

(30) Foreign Application Priority Data

Mar. 24, 2020 (EP) .................................... 20165141

(51) Int. Cl.
*H02S 50/10* (2014.01)
*H02J 3/00* (2006.01)

(52) U.S. Cl.
CPC .............. *H02S 50/10* (2014.12); *H02J 3/004* (2020.01); *H02J 2300/26* (2020.01)

(58) Field of Classification Search
CPC .......... H02S 50/10; H02S 50/00; H02S 50/15; H02J 3/004; H02J 2300/26; H02J 2300/22;

(Continued)

(56) References Cited

U.S. PATENT DOCUMENTS 9,347,827 B2 * 5/2016 Stueve ................... H02S 50/10
9,985,439 B2 * 5/2018 Abido ........................ G05F 1/67
(Continued)

FOREIGN PATENT DOCUMENTS

CN 108649892 A 10/2018
WO WO 2017035629 A1 3/2017

OTHER PUBLICATIONS

M. Tutsch, P. Vojcinak, J. Koziorek and M. Skrepek, "Using automated evaluation of efficiency for photovoltaic power plant," ETFA2011, Toulouse, France, 2011, pp. 1-4, doi: 10.1109/ETFA. 2011.6059189. (Year: 2011).*
Wasim Javed, Bing Guo, Benjamin Figgis, Modeling of photovoltaic soiling loss as a function of environmental variables, Solar Energy, vol. 157, (Year: 2017).*

(Continued)

*Primary Examiner* — Huy Q Phan
*Assistant Examiner* — Martin Walter Braunlich
(74) *Attorney, Agent, or Firm* — Schmeiser, Olsen & Watts, LLP (57) ABSTRACT

In order to detect power production degradation of a solar power plant (SPP) with at least one photovoltaic module (PVM), by which the detection of power production degradation, affected for instance by long term aging or soiling of the photovoltaic module of the solar power plant, is automated and carried out sensorless, it is proposed to determine the degradation by calibrating local measurements of data related to module/plant-internal parameters (PT) such as irradiance I and temperature T or electric power P and temperature as measurement data ($MD_{I,ti}$, $MD_{T,ti}$, $MD_{P,ti}$) against irradiance reference data ($RD_{I,ti}$) for instance satellite data in the form of weather data for the same time and then analyze a variation of the calibration.

8 Claims, 4 Drawing Sheets

(58) Field of Classification Search
CPC ....... H02J 2300/24; Y02E 10/56; G01W 1/10; G01W 1/12; Y04S 40/20
See application file for complete search history.

(56) References Cited

U.S. PATENT DOCUMENTS

| | | | | |
|---|---|---|---|---|
| 10,284,139 | B2* | 5/2019 | Gostein | H02S 50/00 |
| 10,509,868 | B2* | 12/2019 | He | G06F 30/20 |
| 10,599,747 | B1* | 3/2020 | Hoff | G06Q 50/06 |
| 10,643,128 | B2* | 5/2020 | Chang | G06N 3/045 |
| 10,663,620 | B2* | 5/2020 | Bing | H02S 50/00 |
| 2011/0282514 | A1* | 11/2011 | Ropp | G01W 1/10 |
| | | | | 700/297 |
| 2016/0190984 | A1* | 6/2016 | Caine | H02S 50/00 |
| | | | | 702/60 |
| 2018/0196092 | A1 | 7/2018 | McBrearty et al. | |
| 2018/0275314 | A1* | 9/2018 | Pavlovski | G01W 1/12 |
| 2022/0166217 | A1* | 5/2022 | Cassagne | G06Q 10/04 |

OTHER PUBLICATIONS

Solar Plaza, "Soiling: The Science & Solutions", White-Paper-Soiling_The-Science-Solutions.pdf.

Matthew J. Reno, Clifford W. Hansen, "Identification of periods of clear sky irradiance in time series of GHI measurements", Renewable Energy 90 (2016) 520-531, Identification of periods of clear sky irradiance in time series of GHI measurements.pdf.

Mate Heisz et al: "Operation & Maintenance Best Practices Guidelines / Version 3.0"; Solar Power Europe; Dec. 31, 2018; pp. 1-98; XP055725572; Retrieved from the Internet: URL:https://www.solarpowereurope.org/wp-content/uploads/2019/08/3218_SPE_OM_report_version_3.0.07_mr_linked.pdf?cf-id=16799.

Hajjaj Charaf et al: "Evaluation, comparison and experimental validation of different PV power prediction models under semi-arid climate"; Energy Conversion and Management; Elsevier Science Publishers; Oxford, GB; vol. 173; Aug. 6, 2018; pp. 476-488; XP085454156; ISSN: 0196-8904; DOI: 10.1016/J.ENCONMAN.2018.07.094.

* cited by examiner

FIG 4

METHOD, COMPUTER-IMPLEMENTED TOOL AND POWER PLANT CONTROL DEVICE FOR DETECTING POWER PRODUCTION DEGRADATION OF SOLAR POWER PLANTS AND SOLAR POWER PLANT SYSTEM

CROSS-REFERENCE TO RELATED APPLICATIONS

This application claims priority to European Application No. 20165141.1, having a filing date of Mar. 24, 2020, the entire contents of which are hereby incorporated by reference.

FIELD OF TECHNOLOGY

The following refers to a method for detecting power production degradation of solar power plants, a computer-implemented tool for detecting power production degradation of solar power plants, a power plant control device for detecting power production degradation of solar power plants; and a Solar power plant system.

BACKGROUND

Solar power plants are used in the domain of renewable electrical power generation to generate electrical power based on solar irradiation, which is enabled by photovoltaic modules for instance in the form of panels or strings.

This generation is influenced by degradation factors. One of the main factors is soiling, i.e. photovoltaic modules such as strings or panels getting dirty and by this reducing the irradiation that reaches the solar cell. Further effect is the slow degradation of the solar plant due to aging.

The detection of photovoltaic power generation losses and the differentiation, whether these are remediable or due to long term aging, is key aspect of detecting power production degradation of solar power plants. The remediable losses, like soiling, can be easily fixed by maintenance actions like cleaning of the modules, strings or panels, thus reducing the losses.

Typically for solar respectively photovoltaic plants, according to the conventional art, is the performance ratio computed for a given period, e.g., day, week, month. This is achieved by dividing the produced energy of the solar or photovoltaic plant by the energy received from the sun, which is normalized to Standard test Conditions (STC) over the period. This is a good indication of the performance, but typically a variability of 5 to 10% of the performance ratio can be observed, or even more, due to different issues such as availability of the plant, external factors such as temperature, level of irradiation, accuracy of Maximum Power Point (MPP) tracking and soiling. This variability prohibits the detection of effects like soiling and degradation of the plant.

Other approaches are based on the comparison of the plant production with other plants in the region. This is a source of information for the performance evaluation of the plant.

Another approach is the use of satellite data. Typically, these are used in the planning phase in the form of a "Typical Meteorological Year (TMY)", e.g., the label sizes P50, P90). There are also approaches to replace the local irradiation measurements with satellite data in the performance computation during the operation.

For the detection of soiling the most common approach, according to the conventional art, is the use of local reference sensors. Such solutions either include manual cleaning of reference sensors or they require hardware solutions where the cleaning is automated and/or performed by robots. These solutions are expensive because they require manual effort and/or additional hardware, and further on hardware mechanical solutions are susceptible to damage.

SUMMARY

An aspect relates to a method, computer-implemented tool and power plant control device for detecting power production degradation of solar power plants as well as a solar power plant system, by which the detection of power production degradation, affected for instance by long term aging or soiling of at least one photovoltaic module of the solar power plant, is automated and carried out sensorless.

The main idea of embodiments of the invention for detecting power production degradation of a solar power plant with at least one photovoltaic module is to determine the degradation by calibrating local measurements of data related to module/plant-internal parameters such as irradiance and temperature or electric power and temperature as measurement data against irradiance reference data for instance satellite data in the form of weather data for the same time and then analyze a variation of the calibration.

This calibration operation includes the following three steps:

1. Collecting the cited data in time series, e.g., during a recurring, in particular periodic, time interval, and storing them, in a database.

In particular the following data or information are collected:

Alternate Current (AC) power information/data of the solar power plant measured with a local power meter.

Power measurement information from every measured power source of the solar power plant, e.g., inverter, photovoltaic string or module.

Control actions information on the solar power plant, e.g., curtailment, operation mode if available.

Local Global Horizontal Irradiance (GHI) and/or Plane Of Array Irradiance (POA) for each field of the solar power plant measured by local sensors, wherein all panels in one field are assumed to have same orientation and with the panel as an array of photovoltaic modules.

Temperature information measured on the back of each panel for each field.

Satellite based meteorological information for the solar power plant as the irradiance reference data for instance: Local Global Horizontal Irradiance (GHI) and/or Plane of Array Irradiance (POA), which is received from a data provider.

2. Selecting a time period and estimating, by computing, model factors of an equivalence model by calculating an equivalence function to determine a model equivalence between at least the local irradiation measurements or at least power measurements and the satellite-based irradiance reference data, which is performed for a time period regularly over numerous time periods with equal or variable time durations. Such a time period can be e.g., one day up to one week.

For each time period the following processing is executed or performed either optionally or mandatorily:

Optionally, as an advantageous development of embodiments of the invention, time periods with bad data are eliminated. Such eliminations relate to time periods when there are outages of the solar power plant or power curtailment of the solar power plant due to control actions.

This can be done either by directly evaluating control signal-based operational metadata from the solar power plant or a photovoltaic site, if available, or by comparing the produced power of the solar power plant to the measured irradiation.

synchronization issues, e.g., between irradiation and electric power measurements, and "maximum-power-point (MPP)"-tracking issues by detecting clear sky conditions and then keeping only the periods with clear sky. Methods for clear sky detections are known from the state of the art, e.g. This has a quite important effect on the model stabilization.

Mandatorily, estimating a temperature compensation factor, an irradiance compensation factor and a variability compensation factor or a temperature compensation factor, an electric power compensation factor and a variability compensation factor by imposing each that the compensated equivalence between the local measurements and the satellite-based irradiance reference data remains stable, which means that the temperature and the irradiation compensation parameters respectively the temperature and the electric power compensation parameters remain the same over the lifetime of the plant, whereas the only variable parameter is the variability compensation factor, a proportionality factor, which is influenced by soling and slow degradation of the sensors and the photovoltaic modules, strings or panels.

The estimation of the compensation factors can be calculated advantageously by a linear function as the equivalence function referring to the estimation of the temperature compensation factor, the irradiance compensation factor and the variability compensation factor and referring to the estimation of the temperature compensation factor, the electric power compensation factor and the variability compensation factor.

3. Detecting soiling and long-term degradation. This is done by evaluation the evolution of the variability compensation factor respectively the proportionality factor in the form a trend analysis.

So variations that fall back from time to time to the same value (long term trend) are due to soiling that gets cleaned due to rain or service cleaning. This builds up to several percentage variation compared with the long-term variations which should be around 1% or less per year.

Further long-term variations are typically due to slow degradation of the solar power plant or the photovoltaic modules, strings or panels. So slow variation over years can indicate degradation of these devices.

Figure 4:
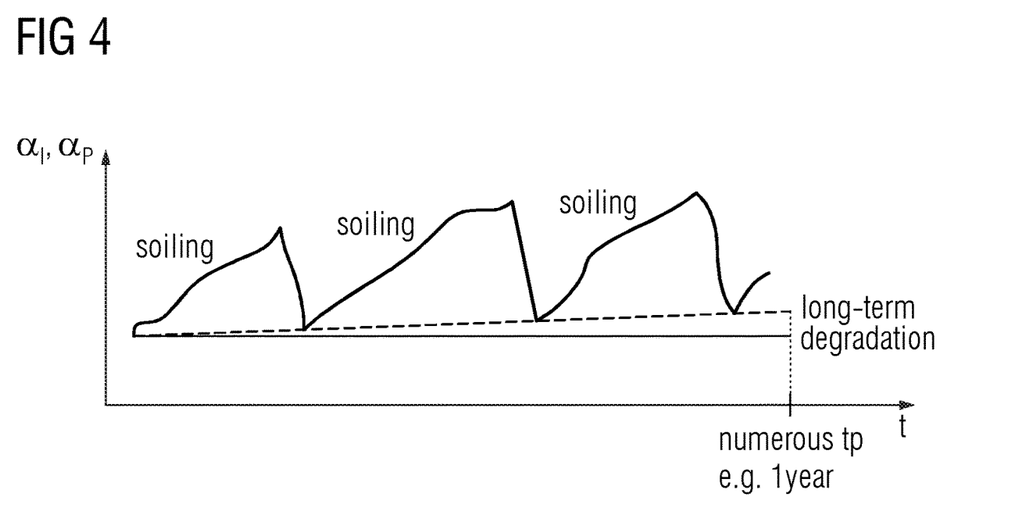
FIG. 4 shows a visualizing chart depicting a time-based variation of a variability compensation factor.

These effects are visualized in FIG. 4. So, soiling during weeks/months will lead to an increase of the variability compensation factor respectively the proportionality factor and it has jumps in case of cleaning/rain.

The computation outlined above can be performed for the entire solar power plant, at the inverter and on the level of the photovoltaic modules, strings or panels.

The calibration step of the different environmental influences, including the selection of clear sky conditions for the calibration mentioned above is the key aspect of differentiating embodiments of the current invention report from those approaches introduced in the introductory part of the application.

The differentiation to these approaches is the comparison and calibration of the satellite-based irradiation reference data with the local measurements and identification of jumps in case of cleaning/rain to discriminate soiling from other long-term degradation effects.

The benefits of the proposed digital solution concerning the problem initially discussed are the robustness and the inexpensiveness of the approach outlined above in comparison to the state-of-the-art approaches using the support of sensors for indicating a manual cleaning or a cleaning with mechanical devices. The cost reduction by detecting when cleaning is needed and by this avoiding unneeded service costs is given by the fact that it is advantageous to generate a time information for initiating an action to counter the power production degradation such as the cleaning necessity of the photovoltaic modules, strings or panels due to soiling as result of evaluating the evolution of the variability compensation factor respectively the proportionality factor in the form a trend analysis.

BRIEF DESCRIPTION

Some of the embodiments will be described in detail, with references to the following Figures, wherein like designations denote like members, wherein.

DETAILED DESCRIPTION

Figure 1:
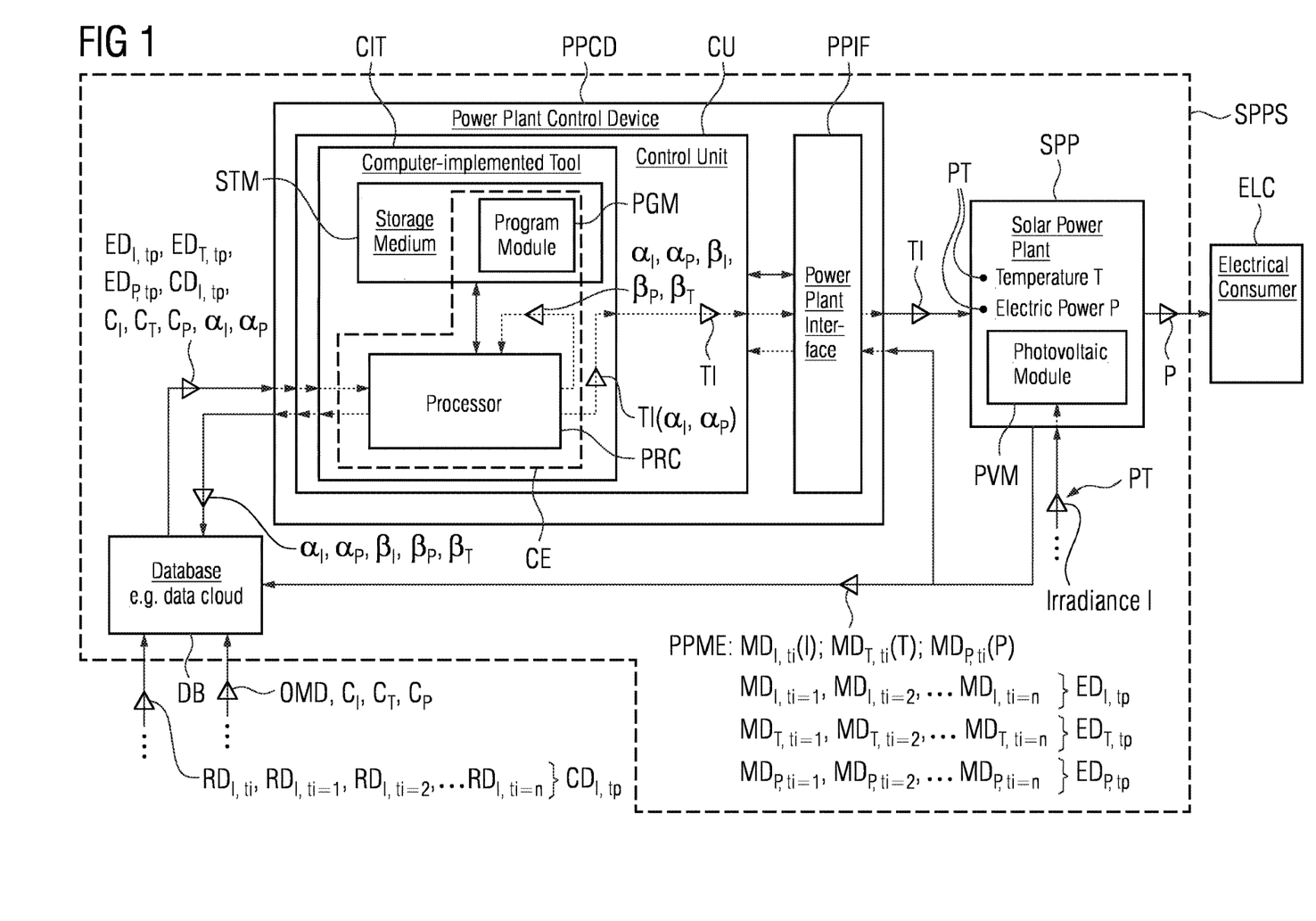
FIG. 1 shows a solar power plant system for detecting power production degradation of solar power plants based on the assessment of irradiation or electric power measurements as an "implementation-concept"

FIG. 1 shows a solar power plant system SPPS for detecting power production degradation of a solar power plant SPP with at least one photovoltaic module PVM as an "implementation-concept". According to this depiction the solar power plant system SPPS includes, besides the solar power plant SPP with the at least one photovoltaic module PVM having module/plant-internal parameters PT such as inter alia an irradiance I, which is at least one of a "Global Horizontal Irradiance <GHI>" and a "Plane Of Array Irradiance <POA Irradiance>", as a first parameter and a temperature T as a second parameter (option I) or as inter alia the measurement of an electric power P as a first parameter and a temperature T as a second parameter (option II), in the context of the solar power production as a central component for controlling and managing purposes with regard to the solar power production a power plant control device PPCD and moreover a database DB, which is designed as a data cloud. One of the usual goals of the power plant control device PPCD is to enable an electrical consumer ELC, which is connected to the solar power plant SPP and which is designed for instance as an electrical device in general to get a requested electrical power P. For this goal and the cited purposes the power plant control device PPCD includes a control unit CU and a power plant interface PPIF, wherein the corresponding control of the solar power plant SPP is carried out by the control unit CU via the power plant interface PPIF.

Furthermore in the context of the detecting task of the solar power plant system SPPS the power plant control device PPCD with the cited two components, the control unit CU and the power plant interface PPIF, is also responsible for detecting the power production degradation of the solar power plant SPP. Therefor according to the "implementation-concept" depicted in the FIG. 1 the control unit CU includes a computer-implemented tool CIT which is implemented as a sub-unit in the control unit CU. The computer-implemented tool CIT is a computer-program-product which is designed as an application software, called as APP, that allows, when it is implemented, to perform special tasks. So, in the present case of the control unit CU, where the computer-program-product respectively the APP is implemented, the computer-implemented tool CIT is used for detecting the power production degradation of the solar power plant SPP.

To this end the computer-implemented tool CIT comprises a non-transitory, processor-readable storage medium STM, in which processor-readable program-instructions of a program module PGM are stored. This program module PGM is used for detecting the power production degradation of the solar power plant SPP. Moreover the computer-implemented tool CIT comprises a processor PRC connected with the storage medium STM executing the processor-readable program-instructions of the program module PGM to detect the power production degradation, wherein the program module PGM and the processor PRC form a calculation engine CE for doing this detection.

The detection is generally based on power plant measurements PPME, which however are carried out independently from the detection process itself. So, from the at least one photovoltaic module PVM of the solar power plant SPP or from the solar power plant SPP measurement data are collected and stored. This data collection and storage arise from power plant measurements PPME of the module/plant-internal parameters PT.

So, according to a first option I the data collection and storage arise from inter alia the measurement of the irradiance I as the first parameter and the temperature T as the second parameter, whereas alternatively according to a second option II the data collection and storage arise from inter alia the measurement of the electric power P as the first parameter and the temperature T as the second parameter.

The power plant measurements PPME occur for both options I, II during a recurring time interval ti, which is at the most over a lifetime of the solar power plant SPP. The measurements are done advantageously in a continuous manner, e.g., n times.

Thus, in the case of the first option I the cited measurement data for the time interval ti include each irradiation measurement data $MD_{I,ti}$ related to the measured irradiance I and temperature measurement data $MD_{T,ti}$ related to the measured temperature T and in the case of the second option II the cited measurement data for the time interval ti include each electric power measurement data $MD_{P,ti}$ related to the measured electric power P and the temperature measurement data $MD_{T,ti}$ related to the measured temperature T.

In both cases I, II the storage of the data $MD_{I,ti}$, $MD_{T,ti}$, $MD_{P,ti}$, collected per each time interval ti, takes place in the database DB.

This means that in the database DB for the n time intervals ti, namely time intervals ti=1, ti=2, ... ti=n,
  irradiation measurement data $MD_{I,ti=1}$, $MD_{I,ti=2}$, ... $MD_{I,ti=n}$ of the direct current measurement data $MD_{I,ti}(I)$,
  temperature measurement data $MD_{T,ti=1}$, $MD_{T,ti=2}$, ... $MD_{T,ti=n}$ of the temperature measurement data $MD_{T,ti}(T)$ and
  electric power measurement data $MD_{P,ti=1}$, $MD_{P,ti=2}$, ... $MD_{P,ti=n}$ of the electric power measurement data $MD_{P,ti}(P)$ are stored.

Besides the cited data in the database DB it is also stored irradiance reference data $RD_{I,ti}$ related to the measured irradiance I per time interval ti, operational metadata OMD of the solar power plant SPP relating to outages of the solar power plant SPP or power curtailment due to control actions of the solar power plant SPP, irradiance data $C_I$ relating a "standard test conditions irradiance" for instance about 1000 $\{W/m^2\}$, temperature data $C_T$ relating a "standard test conditions temperature" for instance about 25 degree Celsius and electric power data $C_P$ relating a nominal electrical power of the photovoltaic module PVM respectively the solar power plant SPP.

Regarding the storage of the irradiance reference data $RD_{I,ti}$ this means also that in the database DB for the n time intervals ti, namely the time intervals ti=1, ti=2, ... ti=n, irradiation reference data $RD_{I,ti=1}$, $RD_{I,ti=2}$, ... $RD_{I,ti=n}$ of the stored irradiation reference data $RD_{I,ti}$ are stored.

For doing now the cited detection of the power production degradation of the solar power plant SPP according to the first option I the calculation engine CE formed by the processor PRC and the program module PGM
  (1) selects a time period tp with tp≥n·ti and n∈N,
  (2) executes an equivalence model for the time period tp by
    accessing to, inputting into the calculation engine CE,
    irradiation evaluation data $ED_{I,tp}$ including the irradiation measurement data $MD_{I,ti=1}$, $MD_{I,ti=2}$, ... $MD_{I,ti=n}$ stored for the n time intervals ti in the database DB,
    irradiation comparison data $CD_{I,tp}$ including the irradiation reference data $RD_{I,ti=1}$, $RD_{I,ti=2}$, ... $RD_{I,ti=n}$ stored for the n time intervals ti in the database DB and
    temperature evaluation data $ED_{T,tp}$ including the temperature measurement data $MD_{T,ti=1}$, $MD_{T,ti=2}$, ... $MD_{T,ti=n}$ stored for the n time intervals ti in the database DB,
    calculating an equivalence function $f(ED_{I,tp}, ED_{T,tp})$ to determine the model equivalence between the irradiation evaluation data $ED_{I,tp}$ and the temperature evaluation data $ED_{T,tp}$ on the one hand and the irradiation comparison data $CD_{I,tp}$ on the other hand,
  (3) estimates for the determination of the model equivalence a temperature compensation factor $\beta_T$, a irradiance compensation factor $\beta_I$ and a variability compensation factor $\alpha_I$, which is a proportionality compensation factor, and with the stipulation that the temperature compensation factor $\beta_T$ and the irradiance compensation factor $\beta_I$ remain the same over a lifetime of the solar power plant SPP and the only variable size is the variability compensation factor $\alpha_I$, which is influenced by the power production degradation,
  (4) evaluates or does a trend analysis of an evolutionary course of the variability compensation factor $\alpha_I$ being estimated accordingly over numerous time periods tp with constant or variable time durations.

Alternatively, for doing the cited detection of the power production degradation of the solar power plant SPP according to the second option II the calculation engine CE formed by the processor PRC and the program module PGM
  (1) selects again the time period tp with tp≥n·ti and n∈N,
  (2) executes a further equivalence model for the time period tp by
    accessing to, inputting into the calculation engine CE, electric power evaluation data $ED_{P,tp}$ including the electric power measurement data $MD_{P,ti=1}$, $MD_{P,ti=2}$, ... $MD_{P,ti=n}$ stored for the n time intervals ti in the database DB, the irradiation comparison data $CD_{I,tp}$ including the irradiation reference data $RD_{I,ti=1}$, $RD_{I,ti=2}$, ... $RD_{I,ti=n}$ stored for the n time intervals ti in the database DB and the temperature evaluation data $ED_{T,tp}$ including the temperature measurement data $MD_{T,ti=1}$, $MD_{T,ti=2}$, ... $MD_{T,ti=n}$ stored for the n time intervals ti in the database DB, calculating a further equivalence function $f(ED_{P,tp}, ED_{T,tp})$ to determine the model equivalence between the electric power evaluation data $ED_{P,tp}$ and the temperature evaluation data $ED_{T,tp}$ on the one hand and the irradiation comparison data $CD_{I,tp}$ on the other hand, (3) estimates for the determination of the model equivalence the temperature compensation factor $\beta_T$, an electric power compensation factor $\beta_P$ and a variability compensation factor $\alpha_P$, which is also a proportionality compensation factor, and with the stipulation that the temperature compensation factor $\beta_T$ and the electric power compensation factor $\beta_P$ remain the same over a lifetime of the solar power plant SPP and the only variable size is a variability compensation factor $\alpha_P$, which is influenced by the power production degradation, (4) evaluates or does again the trend analysis of the evolutionary course of the variability compensation factor $\alpha_P$ being estimated accordingly over numerous time periods tp with constant or variable time durations.

The equivalence function $f(ED_{I,tp}, ED_{T,tp})$ according to the first option I is a linear function with $$f(ED_{I,tp,i}, ED_{T,tp,i}) = \alpha_I \cdot ED_{I,tp,i} \cdot (1 + \beta_T(ED_{T,tp,i} - C_T)) \cdot (1 + \beta_I(ED_{I,tp,i} - C_I)),$$

wherein the variability compensation factor $\alpha_I$ is of a size $\{1\}$ $ED_{I,tp,i}$ is an i-th irradiation evaluation data for the time period tp respectively the i-th of the n irradiation measurement data $MD_{I,ti=1}$, $MD_{I,ti=2}$, ... $MD_{I,ti=n}$ each locally measured by a local sensor for the time period ti and correspondingly stored, $ED_{T,tp,i}$ is an i-th temperature evaluation data for the time period tp respectively the i-th temperature measurement data of the n temperature measurement data $MD_{T,ti=1}$, $MD_{T,ti=2}$, ... $MD_{T,ti=n}$ each locally measured on the back of the photovoltaic module PVM of the solar power plant SPP for the time period ti and correspondingly stored, $C_T$ is the irradiance data relating the "standard test conditions temperature", in particular 25 degree Celsius, and stored in the database $C_I$ is the temperature data relating the "standard test conditions irradiance", in particular 1000 $\{W/m^2\}$, and stored in the database DB, a value estimation of the compensation factors $\alpha_I$, $\beta_T$, $\beta_I$ can be written as:

$$\alpha_I, \beta_T, \beta_I = \mathrm{argmin} \sum\nolimits_{i=1}^{n} [CD_{I,tp,i} - f(ED_{I,tp,i}, ED_{T,tp,i})]^2.$$

The further equivalence function $f(ED_{P,tp}, ED_{T,tp})$ according to the first option II is a further linear function with $$f(ED_{P,tp,i}, ED_{T,tp,i}) = \alpha_P \cdot ED_{P,tp,i} \cdot (1 + \beta_T(ED_{T,tp,i} - C_T)) \cdot (1 + \beta_P(ED_{P,tp,i} - C_P)),$$

wherein the variability compensation factor $\alpha_P$ is of a size $\{W/W \cdot m^2\}$.

$ED_{P,tp,i}$ is an i-th electrical power measurement data for the time period tp respectively the i-th of the n electrical power measurement data $MD_{P,ti=1}$, $MD_{P,ti=2}$, ... $MD_{P,ti=n}$ each locally measured by a power meter for the time period ti and correspondingly stored, $MD_{T,tp,i}$ is an i-th temperature measurement data for the time period tp respectively the i-th temperature measurement data of the n temperature measurement data $MD_{T,ti=1}$, $MD_{T,ti=2}$, ... $MD_{T,ti=n}$ each locally measured on the back of the photovoltaic module PVM of the solar power plant SPP for the time period ti and correspondingly stored, $C_T$ is the temperature data relating the "standard test conditions temperature", in particular 25 degree C., and stored in the database DB $C_P$ is the electric power data relating the nominal electrical power of the photovoltaic module PVM respectively the solar power plant SPP and stored in the database DB, a value estimation of the compensation factors $\alpha_I$, $\beta_T$, $\beta_I$ can be written as:

$$\alpha_P, \beta_T, \beta_P = \mathrm{argmin} \sum\nolimits_{i=1}^{n} [CD_{I,tp,i} - f(ED_{P,tp,i}, ED_{T,tp,i})]^2.$$

Moreover, for extending the cited detection of the power production degradation of the solar power plant SPP advantageously at least one of the following is done by the calculation engine CE. So, the calculation engine CE is designed such that:

(i) A time information TI for initiating an action to counter the power production degradation is outputted as result of evaluating or doing the trend analysis of the evolutionary course of the variability compensation factor $\alpha_I$, $\alpha_P$, (ii) the time period tp for detecting the power production degradation is cleaned by inter alia eliminating periods with useless data or bad data, which is stored for instance in the database DB, due to the operational metadata OMD of the solar power plant SPP relating to outages of the solar power plant SPP or power curtailment due to control actions of the solar power plant SPP and/or used for at least one of synchronization and maximum-power-point-tracking issues.

Figure 2:
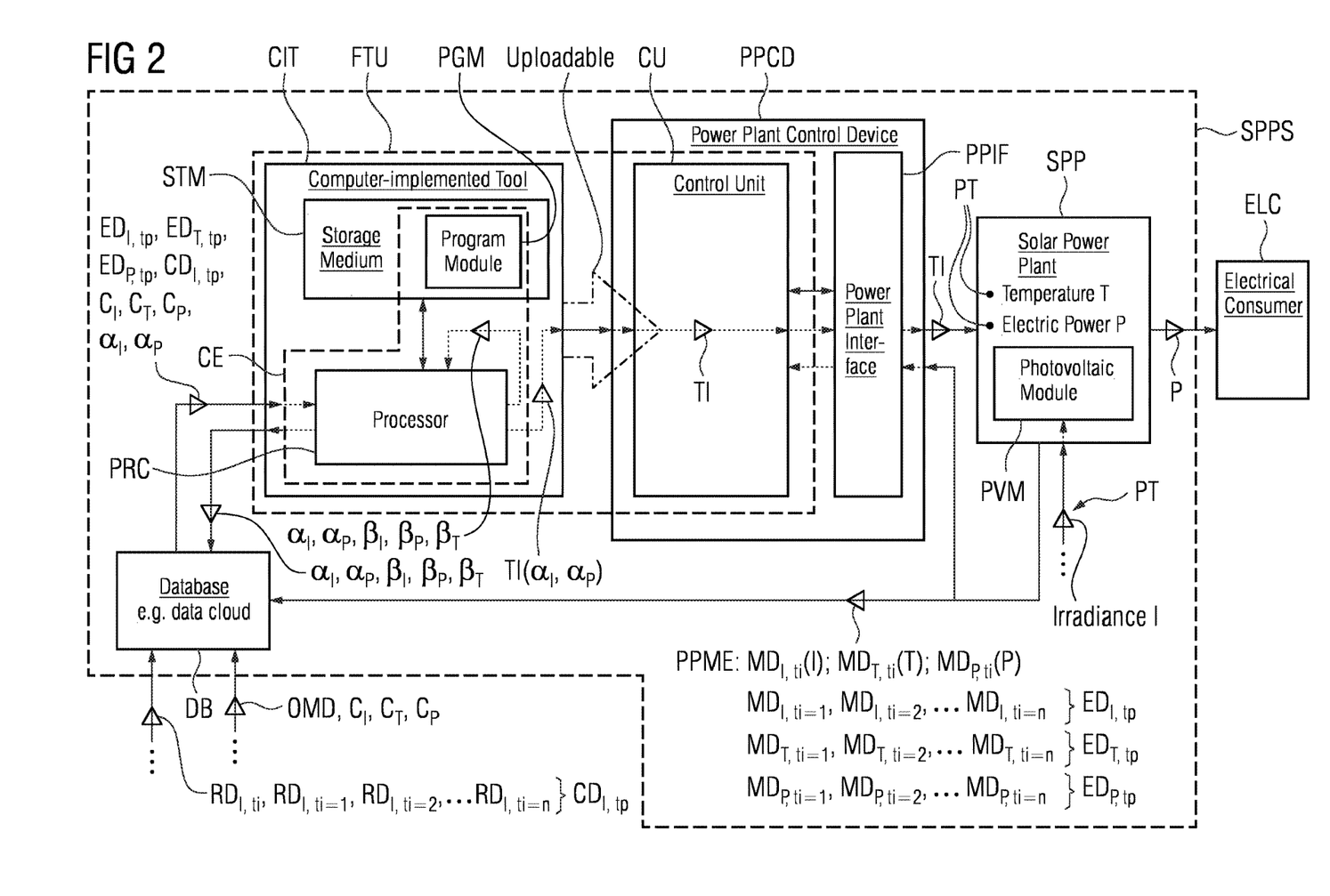
FIG. 2 shows a solar power plant system for detecting power production degradation of solar power plants based on the assessment of electric power measurements as a "functional-unit-concept"

FIG. 2 shows a solar power plant system SPPS for detecting power production degradation of a solar power plant SPP with at least one photovoltaic module PVM as a "functional-unit-concept". Also according to this depiction the solar power plant system SPPS includes, besides the solar power plant SPP with the at least one photovoltaic module PVM having module/plant-internal parameters PT such as inter alia the irradiance I, which is again at least one of a "Global Horizontal Irradiance <GHI>" and a "Plane Of Array Irradiance <POA Irradiance>", as the first parameter and the temperature T as the second parameter (option I) or as inter alia the measurement of the electric power P as the first parameter and the temperature T as the second parameter (option II), in the context of the solar power production as the central component for controlling and managing purposes with regard to the solar power production the power plant control device PPCD and moreover the database DB, which is again designed as the data cloud. One of the usual goals of the power plant control device PPCD again is to enable the electrical consumer ELC, which again is connected to the solar power plant SPP and which is designed also for instance as an electrical device in general to get the requested electrical power P. For this goal and the cited purposes the power plant control device PPCD includes again the control unit CU and the power plant interface PPIF, wherein the corresponding control of the solar power plant SPP is carried out by the control unit CU via the power plant interface PPIF.

In the context of the detecting task of solar power plant system SPPS the power plant control device PPCD with the cited two components, the control unit CU and the power plant interface PPIF, is now—in contrast to the power plant control device PPCD depicted in the FIG. 1—not directly responsible for detecting the power production degradation of the solar power plant SPP. Therefor according to the "functional-unit-concept" depicted in the FIG. 2 the control unit CU does not include the computer-implemented tool CIT. Instead, the Computer-implemented tool CIT forms a functional unit FTU with the control unit CU. This functional unit FTU is designed such that the Computer-implemented tool CIT is either uploadable into the control unit CU according to the depiction in the FIG. 2 or forms either (not depicted in the FIG. 2) a cloud-based, centralized platform, e.g., a server, for the power plant control device PPCD or a decentralized platform, e.g., a server, for the power plant control device PPCD with a mutual access within the functional unit between the control unit CU and the Computer-implemented tool CIT.

In each of cited variants of realization the computer-implemented tool CIT is again a computer-program-product which in the case upload-functionality is again designed as an application software, called as APP, that allows, when it is implemented, to perform special tasks. So, in the present case of the control unit CU, when the computer-program-product respectively the APP is uploaded, the power plant control device PPCD with uploaded computer-implemented tool CIT is used for detecting the power production degradation of the solar power plant SPP.

To this end the computer-implemented tool CIT comprises again the non-transitory, processor-readable storage medium STM, in which processor-readable program-instructions of the program module PGM are stored. This program module PGM is used for detecting the power production degradation of the solar power plant SPP. Moreover the computer-implemented tool CIT comprises also again the processor PRC connected with the storage medium STM executing the processor-readable program-instructions of the program module PGM to detect the power production degradation, wherein the program module PGM and the processor PRC form again the calculation engine CE for doing this detection.

Here too, the detection is generally based on power plant measurements PPME, which however are carried out, independent, from the detection process itself. So, from the at least one photovoltaic module PVM of the solar power plant SPP or from the solar power plant SPP measurement data are collected and stored. This data collection and storage arise from power plant measurements PPME of the module/plant-internal parameters PT.

So once again, according to the first option I the data collection and storage arise from inter alia the measurement of the irradiance I as the first parameter and the temperature T as the second parameter, whereas again alternatively according to the second option II the data collection and storage arise from inter alia the measurement of the electric power P as the first parameter and the temperature T as the second parameter.

The power plant measurements PPME occur for both options I, II again during the recurring time interval ti. The measurements are done advantageously in a continuous manner, e.g., n times, which are done at the most over a lifetime of the solar power plant SPP.

Thus, in the case of the first option I the cited measurement data for the time interval ti include again each the irradiation measurement data $MD_{I,ti}$ related to the measured irradiance I and the temperature measurement data $MD_{T,ti}$ related to the measured temperature T and in the case of the second option II the cited measurement data for the time interval ti include again each the electric power measurement data $MD_{P,ti}$ related to the measured electric power P and the temperature measurement data $MD_{T,ti}$ related to the measured temperature T.

In both cases I, II again the storage of the data $MD_{I,ti}$, $MD_{T,ti}$, $MD_{P,ti}$, collected per each time interval ti, takes place in the database DB.

This means again that in the database DB for the n time intervals ti, namely time the intervals ti=1, ti=2, ... ti=n,
  the irradiation measurement data $MD_{I,ti=1}$, $MD_{I,ti=2}$, ... $MD_{I,ti=n}$ of the direct current measurement data $MD_{I,ti}(I)$,
  the temperature measurement data $MD_{T,ti=1}$, $MD_{T,ti=2}$, ... $MD_{T,ti=n}$ of the temperature measurement data $MD_{T,ti}(T)$ and
  the electric power measurement data $MD_{P,ti=1}$, $MD_{P,ti=2}$, ... $MD_{P,ti=n}$ of the electric power measurement data $MD_{P,ti}(P)$ are stored.

Besides the cited data in the database DB it is again also stored the irradiance reference data $RD_{I,ti}$ related to the measured irradiance I per time interval ti, the operational metadata OMD of the solar power plant SPP relating to outages of the solar power plant SPP or power curtailment due to control actions of the solar power plant SPP, the irradiance data $C_1$ relating the "standard test conditions irradiance" for instance about 1000 $\{W/m^2\}$, the temperature data $C_T$ relating the "standard test conditions temperature" for instance about 25 degree Celsius and the electric power data $C_P$ relating the nominal electrical power of the photovoltaic module PVM respectively the solar power plant SPP.

Regarding the storage of the irradiance reference data $RD_{I,ti}$ this means also again that in the database DB for the n time intervals ti, namely the time intervals ti=1, ti=2, ... ti=n, the irradiation reference data $RD_{I,ti=1}$, $RD_{I,ti=2}$, ... $RD_{I,ti=n}$ of the stored irradiation reference data $RD_{I,ti}$ are stored.

Again now, for doing the cited detection of the power production degradation of the solar power plant SPP according to the first option I the calculation engine CE formed by the processor PRC and the program module PGM
  (1) selects a time period tp with tp≥n·ti and n∈N,
  (2) executes an equivalence model for the time period tp by
  accessing to, inputting into the calculation engine CE,
  the irradiation evaluation data $ED_{I,tp}$ including the irradiation measurement data $MD_{I,ti=1}$, $MD_{I,ti=2}$, ... $MD_{I,ti=n}$ stored for the n time intervals ti in the database DB,
  the irradiation comparison data $CD_{I,tp}$ including the irradiation reference data $RD_{I,ti=1}$, $RD_{I,ti=2}$, ... $RD_{I,ti=n}$ stored for the n time intervals ti in the database DB and the temperature evaluation data $ED_{T,tp}$ including the temperature measurement data $MD_{T,ti=1}$, $MD_{T,ti=2}$, ... $MD_{T,ti=n}$ stored for the n time intervals ti in the database DB, calculating the equivalence function $f(ED_{I,tp}, ED_{T,tp})$ to determine the model equivalence between the irradiation evaluation data $ED_{I,tp}$ and the temperature evaluation data $ED_{T,tp}$ on the one hand and the irradiation comparison data $CD_{I,tp}$ on the other hand, (3) estimates for the determination of the model equivalence the temperature compensation factor $\beta_T$, the irradiance compensation factor $\beta_1$ and the variability compensation factor $\alpha_1$, which is a proportionality compensation factor, and with the stipulation that the temperature compensation factor $\beta_T$ and the irradiance compensation factor $\beta_1$ remain the same over the lifetime of the solar power plant SPP and the only variable size is the variability compensation factor $\alpha_1$, which is influenced by the power production degradation, (4) evaluates or does the trend analysis of the evolutionary course of the variability compensation factor ai being estimated accordingly over numerous time periods tp with constant or variable time durations.

Again and also alternatively, for doing the cited detection of the power production degradation of the solar power plant SPP according to the second option II the calculation engine CE formed by the processor PRC and the program module PGM (1) selects again the time period tp with tp≥n·ti and n∈N, (2) executes the further equivalence model for the time period tp by accessing to, inputting into the calculation engine CE, the electric power evaluation data $ED_{P,tp}$ including the electric power measurement data $MD_{P,ti=1}$, $MD_{P,ti=2}$, ... $MD_{P,ti=n}$ stored for the n time intervals ti in the database DB, the irradiation comparison data $CD_{I,tp}$ including the irradiation reference data $RD_{I,ti=1}$, $RD_{I,ti=2}$, ... $RD_{I,ti=n}$ stored for the n time intervals ti in the database DB and the temperature evaluation data $ED_{T,tp}$ including the temperature measurement data $MD_{T,ti=1}$, $MD_{T,ti=2}$, ... $MD_{T,ti=n}$ stored for the n time intervals ti in the database DB, calculating the further equivalence function $f(ED_{P,tp}, ED_{T,tp})$ to determine the model equivalence between the electric power evaluation data $ED_{P,tp}$ and the temperature evaluation data $ED_{T,tp}$ on the one hand and the irradiation comparison data $CD_{I,tp}$ on the other hand, (3) estimates for the determination of the model equivalence the temperature compensation factor $\beta_T$, the electric power compensation factor $\beta_P$ and the variability compensation factor $\alpha_P$, which is also a proportionality compensation factor, and with the stipulation that the temperature compensation factor $\beta_T$ and the electric power compensation factor $\beta_P$ remain the same over a lifetime of the solar power plant SPP and the only variable size is a variability compensation factor $\alpha_P$, which is influenced by the power production degradation, (4) evaluates or does again the trend analysis of the evolutionary course of the variability compensation factor aw being estimated accordingly over numerous time periods tp with constant or variable time durations.

Figure 3:
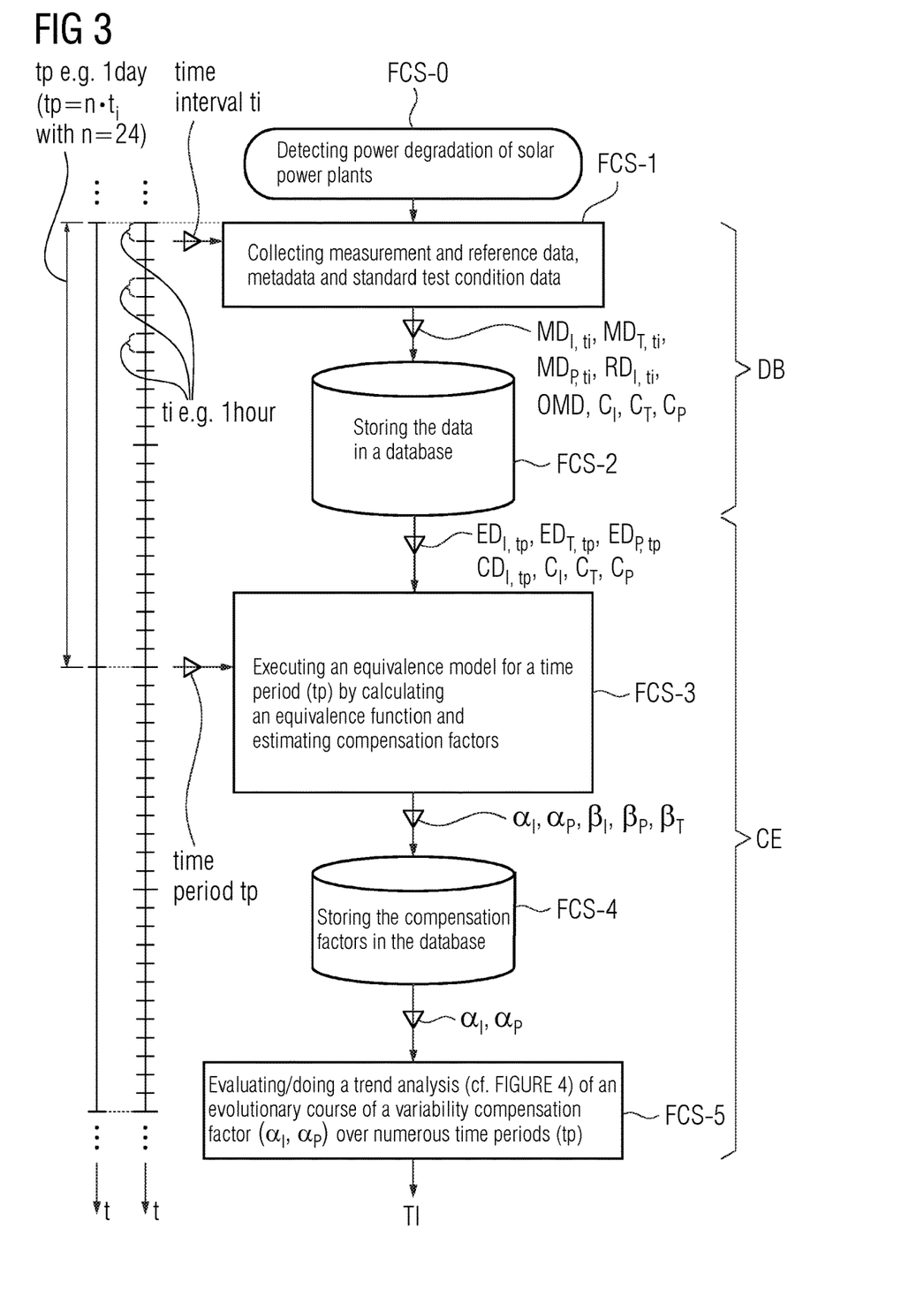
FIG. 3 shows a flowchart of a process detecting power production degradation of solar power plants.

FIG. 3 shows a flow chart of a process detecting power production degradation of solar power plants being initiated in a flow-chart-state FCS-0 and summarizing the entire detecting process according to the description of the FIGS. 1 and 2.

The first process starts with that in a first flow-chart-state FCS-1 and for the time interval ti, which could be for instance 1 hour or any other period of time such as 10 or 15 minutes (i.e. the 1 hour time interval was chosen only for reasons of illustration in relation to the depicted time period tp, e.g., 1 day) relating to solar power plant and/or photovoltaic modules the power plant measurements PPME of the module/plant-internal parameters PT and the collection of either the irradiation measurement data $MD_{I,ti}$ and the temperature measurement data $MD_{T,ti}$ on one side (option I) or the electric power measurement data $MD_{P,ti}$ and the temperature measurement data $MD_{T,ti}$ on the other (option II) as well as the collection of the irradiance reference data $RD_{I,ti}$, the operational metadata OMD, the irradiance data $C_1$, the temperature data $C_T$ and the electric power data $C_P$ are carried out.

In a following second flow-chart-state FCS-2 the collected data $MD_{I,ti}$, $MD_{T,ti}$, $MD_{P,ti}$, $RD_{I,ti}$, OMD, $C_I$, $C_T$, $C_P$ are stored in the database DB. Saying this, the data $RD_{I,ti}$, OMD, $C_I$, $C_T$, $C_P$ do not necessarily have to be saved in the database DB, they can also be get whenever they are needed.

The actions of both flow-chart-state FCS-1, FSC-2 are related to the involvement of the database DB as indicated in the FIG. 3.

In a third flow-chart-state FCS-3 according to the option I and the option II each the equivalence model for the time period tp, which could be for instance 1 day or any other period of time such as 2 or 5 days up to a week (i.e. the 1 day time period was chosen only for reasons of illustration in relation to the depicted time interval ti, e.g., 1 hour), and based on either the irradiation evaluation data $ED_{I,tp}$ including the irradiation measurement data $MD_{I,ti=1}$, $MD_{I,ti=2}$, ... $MD_{I,ti=n}$, the irradiation comparison data $CD_{I,tp}$ including the irradiation reference data $RD_{I,ti=1}$, $RD_{I,ti=2}$, ... $RD_{I,ti=n}$, the temperature evaluation data $ED_{T,tp}$ including the temperature measurement data $MD_{T,ti=1}$, $MD_{T,ti=2}$, ... $MD_{T,ti}$=n, the irradiance data $C_1$ and the temperature data $C_T$ stored for the n time intervals ti in the database DB (option I)

or the electric power evaluation data $ED_{P,tp}$ including the electric power measurement data $MD_{P,ti=1}$, $MD_{P,ti=2}$, ... $MD_{P,ti=n}$, the irradiation comparison data $CD_{I,tp}$ including the irradiation reference data $RD_{I,ti=1}$, $RD_{I,ti=2}$, ... $RD_{I,ti=n}$, the temperature evaluation data $ED_{T,tp}$ including the temperature measurement data $MD_{T,ti=1}$, $MD_{T,ti=2}$, ... $MD_{T,ti=n}$, the electric power data $C_P$ and the temperature data $C_T$ stored also for the n time intervals ti in the database DB (option II) is executed by calculating the equivalence function accordingly and estimating the compensation factors $\alpha_I$, $\alpha_P$, $\beta_I$, $\beta_P$, $\beta_T$ accordingly.

In a subsequent fourth flow-chart-state FCS-4 the estimated compensation factors $\alpha_I$, $\alpha_P$, $\beta_I$, $\beta_P$, $\beta_T$ are stored in the database DB.

Finally, in a subsequent fifth flow-chart-state FCS-5 the power production degradation trend analysis of the evolutionary course of the variability compensation factor $\alpha_I$, $\alpha_P$ being estimated accordingly over numerous time periods tp is evaluated or done. The numerous time periods tp can have time durations being constant or variable.

As result of evaluating or doing the cited trend analysis of the evolutionary course of the variability compensation factor $\alpha_I$, $\alpha_P$ the time information TI for initiating an action to counter the power production degradation is generated.

The actions from the third flow-chart-state FCS-3 to the fifth flow-chart-state FCS-6 are related to the involvement of the calculation engine CE as indicated in the FIG. 3.

FIG. 4 a visualizing chart depicting a time-based variation of the variability compensation factor $\alpha_I$, $\alpha_P$ for detecting soiling and long-term degradation. This is done by evaluation the evolution of the variability compensation factor respectively the proportionality factor in the form of the cited trend analysis:

- So variations that fall back from time to time to the same value (long term trend) are due to soiling that gets cleaned due to rain or service cleaning. This builds up to several percentage variation compared with the long-term variations which should be around 1% or less per year.
- Long-term variations are typically due to slow degradation of the solar power plant or the photovoltaic modules, strings or panels. So slow variation over years indicate degradation of the solar power plant itself or the cited components.

These effects are visualized in the FIG. 4. So, soiling during weeks/months will lead to an increase of the variability compensation factor respectively the proportionality factor and it has jumps in case of cleaning/rain.

Although the present invention has been disclosed in the form of preferred embodiments and variations thereon, it will be understood that numerous additional modifications and variations could be made thereto without departing from the scope of the invention.

For the sake of clarity, it is to be understood that the use of "a" or "an" throughout this application does not exclude a plurality, and "comprising" does not exclude other steps or elements.

The invention claimed is:

1. A power plant control device in a solar power plant (SPP) for detecting power production degradation of the solar power plant, wherein the power plant control device comprises a control unit, a power plant interface and at least one photovoltaic module (PVM), and wherein a) from the at least one photovoltaic module (PVM) of the solar power plant (SPP), due to power plant measurements (PPME) of parameters from the at least one photovoltaic module (PVM) of the solar power plant (SPP), a measurement of an irradiance I as a first parameter and a temperature T as a second parameter during a recurring time interval (ti), irradiation measurement data ($MD_{I,ti}$) and temperature measurement data ($MD_{T,ti}$) are collected and stored, wherein the detecting of the power production degradation comprising aging and/or soiling of the at least one photovoltaic module (PVM) of the solar power plant (SPP) is automated, b) related to the measured irradiance I per time interval (ti), irradiance reference data ($RD_{I,ti}$) is used, wherein: a non-transitory, processor-readable storage medium (STM) comprising processor-readable program-instructions of a program module (PGM) for detecting the power production degradation of the solar power plant (SPP) stored in the non-transitory, processor-readable storage medium (STM) and a processor (PRC) connected with the non-transitory, processor readable storage medium (STM) executing the processor-readable program-instructions of the program module (PGM) to detect the power production degradation, wherein the program module (PGM) and the processor (PRC) form a calculation engine (CE) such that: c) a time period (tp) with tp>n·ti (ti=1, ti=2, . . . ti=n) is selected, d) an equivalence model for the time period (tp) is executed by accessing irradiation evaluation data ($ED_{I,tp}$) including irradiation measurement data ($MD_{I,ti=1}$, $MD_{I,ti=2}$, . . . $MD_{I,ti=n}$) of the irradiation measurement data ($MD_{I,ti}$), irradiation comparison data ($CD_{I,tp}$) including irradiation reference data ($RD_{I,ti=1}$, $RD_{I,ti=2}$, . . . $RD_{I,ti=n}$) of the irradiation reference data ($RD_{I,ti}$) and temperature evaluation data ($ED_{T,tp}$) including temperature measurement data ($MD_{T,ti=1}$, $MD_{T,ti=2}$, . . . $MD_{T,ti=n}$) of the temperature measurement data ($MD_{T,ti}$), calculating an equivalence function $f(ED_{I,tp}, ED_{T,tp})$ to determine a model equivalence between the irradiation evaluation data ($ED_{I,tp}$) and the temperature evaluation data ($ED_{T,tp}$) on the one hand and the irradiation comparison data ($CD_{I,tp}$) on the other hand, e) for the determination of the model equivalence a temperature compensation factor ($\beta_T$), a irradiance compensation factor ($\beta_I$) and a variability compensation factor ($\alpha_I$) a are estimated which is influenced by the power production degradation, and f) a trend analysis of an evolutionary course of the variability compensation factor ($\alpha_I$) being estimated accordingly over numerous time periods (tp) with constant or variable time durations is evaluated or done.

2. The power plant control device according to claim 1, wherein the calculation engine (CE) is configured such that the time period (tp) for detecting the power production degradation is cleaned by inter alia eliminating periods with useless data due to operational metadata (OMD) of the solar power plant (SPP) relating to outages of the solar power plant (SPP) or power curtailment due to control actions of the solar power plant (SPP) and/or used for at least one of synchronization and maximum-power-point-tracking issues.

3. The power plant control device according to claim 1, wherein the calculation engine (CE) is configured such that a time information (TI) for initiating an action to counter the power production degradation is outputted as result of evaluating or doing the trend analysis of the evolutionary course of the variability compensation factor ($\alpha_I$).

4. The power plant control device according to claim 1, wherein the variability compensation factor ($\alpha_I$) is a proportionality compensation factor.

5. The power plant control device according to claim 1, wherein the irradiance I is at least one of a "Global Horizontal Irradiance <GHI>" and a "Plane Of Array Irradiance <POA Irradiance>".

6. The power plant control device according to claim 1, wherein the equivalence function $f(ED_{I,tp}, ED_{T,tp})$ is a linear function with $$f(ED_{I,tp,i}, ED_{T,tp,i}) = \alpha_I ED_{I,tp,i} \cdot (1 + \beta_T(ED_{T,tp,i} - C_T)) \cdot (1 + \beta_I(ED_{I,tp,i} - C_I)),$$

$ED_{I,tp,i}$ is an i-th irradiation evaluation data for the time period (tp) respectively the i-th of the irradiation measurement data ($MD_{I,ti=1}$, $MD_{I,ti=2}$, . . . $MD_{I,ti=n}$) each locally measured by a local sensor for the time period and correspondingly stored; $ED_{T,tp,i}$ is an i-th temperature evaluation data for the time period respectively the i-th temperature measurement data of the temperature measurement data ($MD_{T,ti=1}$, $MD_{T,ti=2}$, . . . $MD_{T,ti=n}$) each locally measured on the back of the photovoltaic module (PVM) of the solar power plant (SPP) for the time period (ti) and correspondingly stored; $C_T$ is a "standard test conditions temperature"; $C_I$ is a "standard test conditions irradiance" and a value estimation of the compensation factors $\alpha_I$, $\beta_T$, $\beta_I$ can be written as:

$$\alpha_I, \beta_T, \beta_I = \mathrm{argmin} \sum_{i=1}^{n} [CD_{I,tp,i} - f(ED_{I,tp,i}, ED_{T,tp,i})]^2.$$

7. A power plant control device (PPCD) in a solar power plant (SPP) for detecting power production degradation of the solar power plant, wherein the power plant control device comprises a control unit (CU), a power plant interface and at least one photovoltaic module (PVM), wherein the detecting of the power production degradation comprising aging and/or soiling of the at least one photovoltaic module (PVM) of the solar power plant (SPP) is automated, wherein a method of the power production degradation is selected from the group consisting of: a) collecting and storing an irradiance I as a first parameter and a temperature T as a second parameter during a recurring time interval (ti), irradiation measurement data ($MD_{I,ti}$) and temperature measurement data ($MD_{T,ti}$); using irradiance reference data ($RD_{I,ti}$) related to the measured irradiance I per time interval (ti); selecting a time period (tp) with tp≥n·ti (ti=1, ti=2, ... ti=n); executing an equivalence model for the time period (tp) by accessing irradiation evaluation data ($ED_{I,tp}$) including irradiation measurement data ($MD_{I,ti=1}$, $MD_{I,ti=2}$, ... $MD_{I,ti=n}$) of the irradiation measurement data ($MD_{I,ti}$), irradiation comparison data ($CD_{I,tp}$) including irradiation reference data ($RD_{I,ti=1}$, $RD_{I,ti=2}$, ... $RD_{I,ti=n}$) of the irradiation reference data ($RD_{I,ti}$) and temperature evaluation data ($ED_{T,tp}$) including temperature measurement data ($MD_{T,ti=1}$, $MD_{T,ti=2}$, ... $MD_{T,ti=n}$) of the temperature measurement data ($MD_{T,ti}$), calculating an equivalence function $f(ED_{I,tp}, ED_{T,tp})$ to determine a model equivalence between the irradiation evaluation data ($ED_{I,tp}$) and the temperature evaluation data ($ED_{T,tp}$) on the one hand and the irradiation comparison data ($CD_{I,tp}$) on the other hand; estimating for the determination of the model equivalence a temperature compensation factor ($\beta_T$), a irradiance compensation factor ($\beta_I$) and a variability compensation factor ($\alpha_I$) which is influenced by the power production degradation; and evaluating or doing a trend analysis of an evolutionary course of the variability compensation factor ($\alpha_I$) being estimated accordingly over numerous time periods (tp) with constant or variable time durations; and/or b) collecting and storing an electric power P as a first parameter and a temperature T as a second parameter during a recurring time interval (ti), electric power measurement data ($MD_{P,ti}$) and temperature measurement data ($MD_{T,ti}$); using irradiance reference data ($RD_{I,ti}$) related to the measured electric power P per time interval (ti) irradiance reference data ($RD_{I,ti}$); selecting a time period (tp) with tp≥n·ti (ti=1, ti=2, ... ti=n); executing an equivalence model for the time period (tp) by accessing to electric power evaluation data ($ED_{P,tp}$) including electric power measurement data ($MD_{P,ti=1}$, $MD_{P,ti=2}$, ... $MD_{P,ti=n}$) of the electric power measurement data ($MD_{P,ti}$), irradiation comparison data ($CD_{I,tp}$) including irradiation reference data ($RD_{I,ti=1}$, $RD_{I,ti=2}$, ... $RD_{I,ti=n}$) of the irradiation reference data ($RD_{I,ti}$) and temperature evaluation data ($ED_{T,tp}$) including temperature measurement data ($MD_{T,ti=1}$, $MD_{T,ti=2}$, ... $MD_{T,ti=n}$) of the temperature measurement data ($MD_{T,ti}$), calculating an equivalence function $f(ED_{P,tp}, ED_{T,tp})$ to determine a model equivalence between the electric power evaluation data ($ED_{P,tp}$) and the temperature measurement data ($ED_{T,tp}$) on the one hand and the irradiation comparison data ($CD_{I,tp}$) on the other hand; estimating for the determination of the model equivalence a temperature compensation factor ($\beta_T$), an electric power compensation factor ($\beta_P$) and a variability compensation factor ($\alpha_P$) which is influenced by the power production degradation; and evaluating or doing a trend analysis of an evolutionary course of the variability compensation factor ($\alpha_P$) being estimated accordingly over numerous time periods (tp) with constant or variable time durations.

8. A solar power plant system (SPPS) comprising:
a database (DB), which on the input side is connected to the solar power plant (SPP),
wherein the power plant control device (PPCD) for detecting the power production degradation according to claim 7 is assigned to the database (DB) and forms a functional unit with the database (DB) such that the method of detecting the power production degradation is carried out.

* * * * *